July 13, 1943.  E. E. LYNCH  2,324,307
AMPERE HOUR METER
Filed Oct. 23, 1942  2 Sheets-Sheet 1
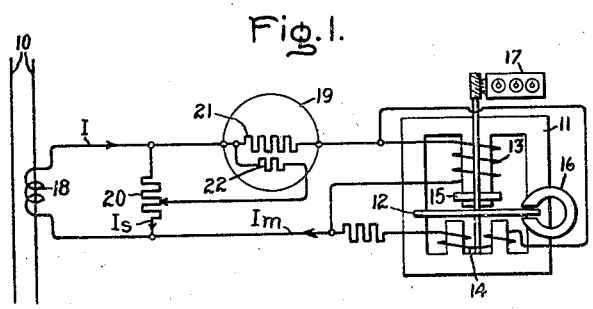
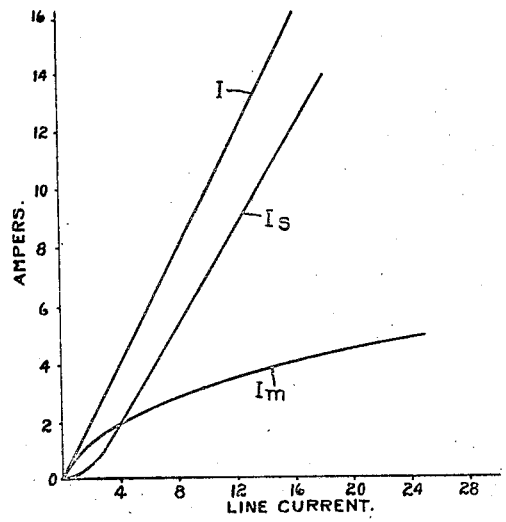
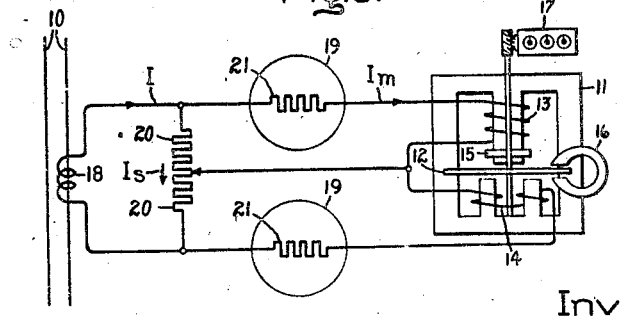
Inventor:
Edward E. Lynch,
by Harry E. Dunham
His Attorney.

July 13, 1943.  E. E. LYNCH  2,324,307
AMPERE HOUR METER
Filed Oct. 23, 1942  2 Sheets-Sheet 2

Inventor:
Edward E. Lynch,
by Harry E. Dunham
His Attorney.

Patented July 13, 1943

2,324,307

UNITED STATES PATENT OFFICE 2,324,307

AMPERE-HOUR METER

Edward E. Lynch, Easthampton, Mass., assignor to General Electric Company, a corporation of New York Application October 23, 1942, Serial No. 463,025

4 Claims. (Cl. 171—34)

My invention relates to the measurement of ampere hours and in particular to an integrating meter of the ampere squared hour type together with apparatus for regulating the current flow therethrough to obtain an integration proportional to ampere hours as distinguished from ampere squared hours.

Figure 4:
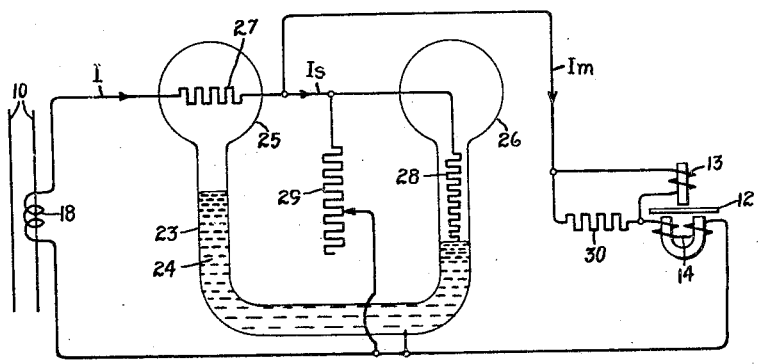
Figure 5:
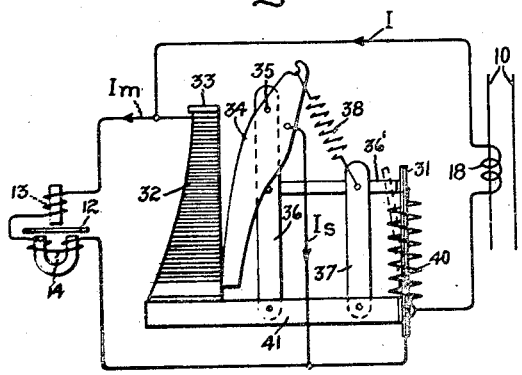
Figure 6:
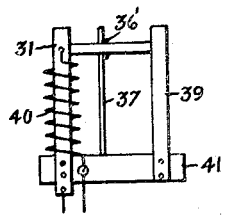

The features of my invention which are believed to be novel and patentable will be pointed out in the claims appended hereto. For a better understanding of my invention reference is made in the following description to the accompanying drawings in which Fig. 1 represents an explanatory embodiment of my invention in which a variable portion of the measurement current is shunted from an integrating meter of the ampere squared hour type such that the meter integrates ampere hours. Fig. 2 shows load current curves explanatory of my invention. Fig. 3 represents an embodiment of my invention employing separate regulators for the two meter energizing coils. Figs. 4 and 5 show different forms of thermal current regulators that may be employed in my invention; and Fig. 6 is a partial end view of the thermal motor device of Fig. 5 as observed from the right in Fig. 5.

Referring now to Fig. 1, 10 represents an alternating current power circuit and 11 an integrating meter of the induction type by means of which it is desired that the ampere hours of circuit 10 be metered. The meter has two electromagnets, one above and one below the conductor disk armature 12. The energizing windings of these electromagnets are designated 13 and 14. The flux produced by winding 13 is shaded by a suitable shading coil 15 so that the fluxes of the two electromagnets will be dephased at a torque producing angle and produce an induction driving torque on the disk 12. The disk is retarded by a damping magnet 16 and the rotations of the disk are counted on a register 17. Heretofore meters of this type have had their windings energized in series or parallel by the line current or a current directly proportional thereto and as thus arranged the meter has a torque proportional to the square of the line current and will thus register ampere squared hours. That is, if speed be plotted against line current the resulting curve will not be a straight line but will curve upward as curve Is is Fig. 2. To register ampere hours the speed should be directly proportional to current and this is the purpose of the present invention.

Accordingly, I provide regulating means associated with the energizing circuit of such a meter to cause the meter energizing current or currents to be reduced in relation to the line current, as the latter increases, to the extent necessary to cause the relation between line current and meter speed to be linear over the measurement range.

In Fig. 1 the meter windings 13 and 14 are energized in parallel from a current transformer 18 through a current responsive automatic regulator 19 and the meter and regulator 19 are shunted by a resistor 20. The total current I from the current transformer divides, a portion Im going through the regulator 19 and meter and the remainder Is going through the shunt circuit 20. For my purposes Im should be equal to $\sqrt{I}$ or $K\sqrt{I}$, where K is a constant.

The relation of total current I to Im and Is is shown in the curve of Fig. 2. The abscissa represents line current I and for any given value of line current on the abscissa the Is and Im current values may be read from the corresponding curves on the ordinate scale. Curve I is also included to show the total current on the same scale. Thus, when I is 16 amperes, $Im = \sqrt{16} = 4$ amperes and $Is = 16 - 4 = 8$ amperes. To obtain this result I provide a self-heating resistance regulator at 19 which has a positive non-linear temperature coefficient of resistance and which therefore causes a greater proportion of the total current I to flow through the shunt at 20 as the current increases. A nickel or iron wire resistor 21 in an evacuated tube may be used. In addition to the heat generated in the resistor 21, I may provide further heating thereof with rise in current by an auxiliary heater 22 carrying a portion of the current Is which is shunted from the meter circuit. By careful selection of the different resistance elements, characteristics closely approaching the ideal may be obtained over a selected current measurement range.

The current range over which acceptable accuracy may be obtained may be increased by providing separate regulators and shunt for both meter windings, as shown in Fig. 3. Here the Im current for the two meter coils may be slightly different at least over part of the measurement range and the regulators 19 may operate over somewhat different temperature ranges, the current distribution being adjusted so that the product of the meter fluxes is proportional to I. Changing the relative distribution of current in coils 13 and 14 changes the meter torque. For example, if the currents in coils 13 and 14 are two amperes each, the torque product is 4, but if the same total current be divided to have 1.8 amperes in one coil and 2.2 amperes in the other coil, the torque product is 3.96. Thus, Fig. 3 provides an additional expedient and increases the flexibility for obtaining the results desired, namely a meter torque and speed proportional to line current and permits of the possibility of changing the relative distribution of current in the meter coils to diminish the torque relative characteristics of the meter at the higher loads instead of shunting so much current therefrom.

In Fig. 4 I have shown a different form of thermal regulator for controlling the current distribution. The regulator comprises a sealed vessel 23 comprising a U tube containing mercury 24 and gaseous expansion chambers 25 and 26. Chamber 25 contains a heater resistance 27 through which the total current I flows. The shunt circuit contains a resistance 28 which is varied by the height of the mercury column below chamber 26, the mercury completing the shunt circuit as shown. 29 represents an auxiliary shunt resistance which may be adjusted for calibration purposes. As the current I increases, mercury is forced upward along resistance 28 to reduce the resistance of the shunt circuit, and resistance 28 may be graduated to obtain the desired results. Various expedients may be resorted to to obtain the correct results. Thus the shape of the sealed chamber may be modified and the temperature coefficients of the various resistances may be selected to produce the results desired. The chamber 26 tends to make the regulator self-compensated for changes in ambient temperature since both chambers 25 and 26 will be similarly influenced by such changes. The division of the current $Im$ in the meter coils 13 and 14 is provided for by a resistor 30 which also may have a temperature coefficient of resistance selected to provide the desired results by a slight change in the meter current distribution in the proper direction with current variations. Or the resistor 30 may be varied in value by a regulator such as later described under Fig. 5—this regulator being activated by the magnitude of the current I or $Is$ or $Im$.

Fig. 5 shows another form of regulator operated by a bimetallic motor device 31 heated by the total current I. In Fig. 5, 32 represents a graduated resistance wire wound on a supporting form 33. 34 represents an adjustable contact in the form of a rocker arm pivoted at 35 to a lever 36. Rocker arm 34 is moved towards and away from the resistance 32 by the bimetallic motor device 31 through a push rod 36' which is pivoted to and supported by link 37. Lever members 36 and 37 are pivoted on the base 41 and are linked to each other by the push rod 36'. When thermal device 31 is heated by the current I, it moves the link mechanism to the left and rocker arm 34 pivoting about point 35 rolls upward along the resistance 32 and changes the point of contact accordingly, cutting out resistance in the shunt circuit. The relative current distribution $Is$ and $Im$ may be proportioned as desired at various values of $Im$ by the graduation of the resistance. A spring 38 holds the rocker arm firmly against the resistance and serves to return it to the high resistance shunt current position represented when the bimetal element 31 cools. Ambient temperature compensation is provided for by using two bimetal elements 31 and 39 as shown in Fig. 6, element 39 being subject to ambient temperature changes only and opposing the action of element 31. As shown in Fig. 6, the I current may be conducted through bimetal strip 31 and also through a heater wire 40 wrapped around it.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. An ampere hour meter comprising an induction meter having a rotatable armature of conducting material, a pair of electromagnets producing out-of-phase fluxes in said armature and a torque thereon proportional to the product of the fluxes of said electromagnets, connections for energizing said electromagnets from an alternating current circuit, a resistance means connected across said connections for shunting current from said meter and regulating means responsive to the amount of current flowing in the alternating current circuit for varying the relative current distribution between said meter and resistance means, such that the product of the fluxes of said electromagnets is proportional to the first power of the current of the alternating current circuit.

2. An ampere hour meter comprising a meter of the induction type having a rotatable armature of conducting material, a pair of electromagnets for producing out-of-phase fluxes on said armature and an armature torque proportional to the product of the fluxes of said electromagnets, an alternating current power circuit, connections for energizing the electromagnets of said meter from the current of said power circuit, a resistance in shunt to at least one of the electromagnets of said meter and an automatic thermal regulator the action of which is responsive to the amount of current flow in said power circuit for controlling the relative proportion of the current of the power circuit which flows through said shunt such that the product of the fluxes of the meter electromagnets will be proportional to the first power of the current flowing in said power circuit.

3. An ampere hour meter of the induction type comprising a rotatable armature of conducting material, a pair of electromagnets producing a torque on said armature proportional to the product of their fluxes, an alternating current power circuit, connections for energizing the electromagnets of said meter in series relation from the current of said power circuit, resistances connected across each electromagnet, and thermal current regulating means responsive to the current of said power circuit for controlling the relative distribution of current between said resistances and electromagnets and between said electromagnets such that the torque of said meter is proportional to the first power of the current of the power circuit.

4. An induction meter of the integrating type having a pair of electromagnets, a rotatable armature of conducting material on which a torque is produced by the fluxes of said electromagnets which torque is proportional to the product of the fluxes of the electromagnets, an alternating current power circuit, connections for energizing the electromagnets of said meter in response to a portion of the current of said power circuit, connections for bypassing the remaining portion of the current of said power circuit from said meter and regulating means responsive to a variable condition of said power circuit for regulating the relative proportion of current of the power circuit which flows in said meter and by-pass connections.

EDWARD E. LYNCH.